T. BELL.
TURBINE NOZZLE.
APPLICATION FILED APR. 15, 1910.
974,108.
Patented Nov. 1, 1910.
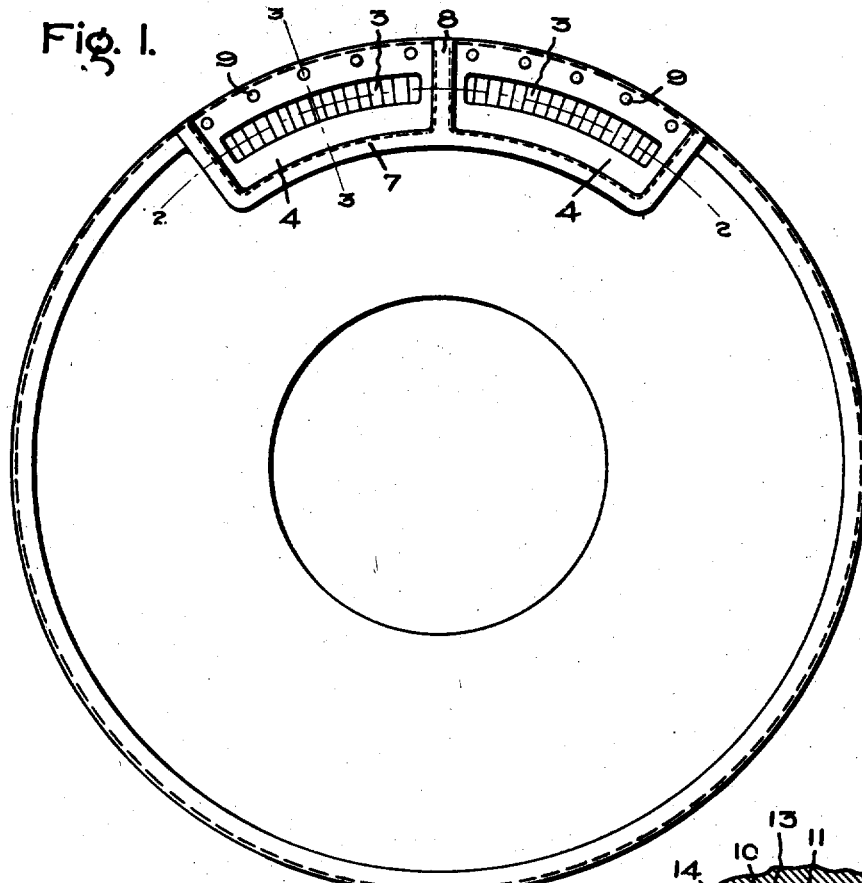
Fig. 1.
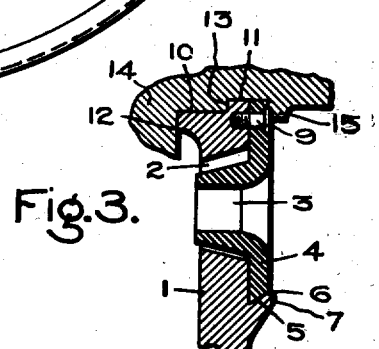
Fig. 3.
Fig. 2.
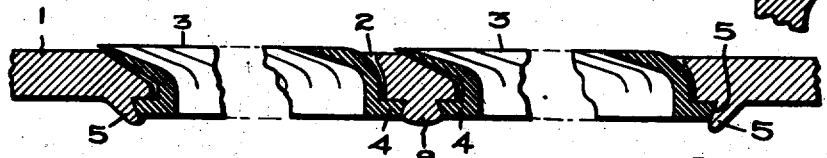
Witnesses:
Marcus L. Byng.
J. Ellis Glen.
Inventor,
Thomas Bell,
by Albert G. Davis,
His Attorney

UNITED STATES PATENT OFFICE.

THOMAS BELL, OF CLYDEBANK, SCOTLAND, ASSIGNOR TO GENERAL ELECTRIC COMPANY, A CORPORATION OF NEW YORK.

TURBINE-NOZZLE.

974,108. Specification of Letters Patent. Patented Nov. 1, 1910.
Application filed April 15, 1910. Serial No. 555,755.

*To all whom it may concern:*

Be it known that I, THOMAS BELL, a subject of the King of Great Britain, residing at Clydebank, county of Dumbarton, North Britain, have invented certain new and useful Improvements in Securing Turbine-Nozzles to Supports, of which the following is a specification.

This invention relates to elastic-fluid turbines and especially of the multi-stage type, and its object is to provide simple and effective means for securing the nozzles to the diaphragms or other supports in such manner that they cannot work loose and damage the moving parts of the turbine.

The invention is applicable to any type of impulse turbine in which the energy of the steam is fractionally abstracted by a plurality of stages, each receiving the steam from the preceding stage through a set of nozzles located in openings in the diaphragm or partitions separating the two stages. The number of nozzles secured to each diaphragm varies according to the volume of fluid to be handled and on the degree of expansion in the corresponding stage. The nozzles may have their walls either diverging or non-diverging, as conditions may require. They are preferably formed in groups, each group being handled as an entity. For convenience, such a group will be hereinafter termed a nozzle, and it is secured to the diaphragm by engaging its beveled edges with undercut grooves on the diaphragm, as hereinafter more fully set forth.

In the accompanying drawing, Figure 1 is a view in elevation of a diaphragm equipped with two nozzles; Fig. 2 is a section on the line 2—2, Fig. 1; and Fig. 3 is a section on the line 3—3, Fig. 1, the two latter figures being on a larger scale than Fig. 1 and Fig. 3 showing also a portion of the casing of the turbine.

The diaphragm, partition or other support 1 is provided with the requisite number of openings 2, one for each nozzle 3, which is made with a flange 4 bearing on one face of the diaphragm around the opening 2. The nozzle projects through the opening, which is of greater width radially than said nozzle, its sides and ends being of a contour to suit the external contour of the nozzle. The ends and inner edge of the flange are beveled, as indicated at 5, and the diaphragm is provided with an undercut groove 6 to fit said bevel. A bead 7 may be provided on the diaphragm to partly or wholly contain the undercut groove, if desired, and the bead and groove are extended to the radial rib 8 between the openings 2. The greater radial width of the opening 2 permits the nozzle 3 to be inserted and the flange 4 then lowered until its beveled edge can be slid into the groove 6, thereby producing a dovetailed joint which effectually holds the nozzle in place. As an additional means for holding it while the diaphragm is being handled, screws 9 may be inserted through apertures in the outer edge of the flange 4 on the nozzle and screwed into tapped holes formed for them in the diaphragm near its outer edge. The periphery of the diaphragm is stepped, as shown at 10 and 11, Fig. 3, and counterpart stepped surfaces or shoulders 12, 13 are formed on the inner surface of the casing 14. There is also provided on the inner surface of the turbine casing an inwardly projecting flange 15 forming with the shoulder 13 a recess of a width to receive the circumferential flange on the diaphragm formed by the stepped portion 11 and also the outer edge of the flange 4 on the nozzle. The flange 15 also covers more or less of the heads of the screws 9, if used, so that there is no danger of their working loose and falling into the interior of the turbine and damaging the bucket wheels.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a turbine, the combination with a nozzle, of a support containing a nozzle-receiving opening which is of greater width radially than said nozzle, and is provided with an undercut groove for an edge of said nozzle.

2. In a turbine, the combination with a nozzle, of a support containing a nozzle-receiving opening which is of greater width radially than said nozzle, and a bead along the ends and one side of said opening containing an undercut groove for an edge of said nozzle.

3. In a turbine, the combination with a nozzle provided with a flange having a beveled edge, of a support containing an opening for said nozzle, and a bead adjacent to said opening having an undercut groove for an edge of said flange.

4. In a turbine, the combination with a nozzle provided with a flange having a beveled edge, of a support containing an opening for said nozzle, a bead adjacent to said opening having an undercut groove for an edge of said flange, and means for retaining said flange engaged with said groove.

5. In a turbine, the combination with a nozzle provided with a flange having a beveled edge, of a diaphragm containing a nozzle-receiving opening of greater radial width than said nozzle and an undercut groove along the ends and one side of said opening to receive an edge of said flange, and screws passing through said flange into said diaphragm along the other side of said opening.

In witness whereof, I have hereunto set my hand this twenty fourth day of March, 1910.

THOMAS BELL.

Witnesses:
CHARLES P. LEIPER,
J. B. HENDERSON.